Nov. 10, 1931.  E. B. HEALEY  1,830,899
AUTOMOBILE RUNNING BOARD LIGHT
Filed May 21, 1930
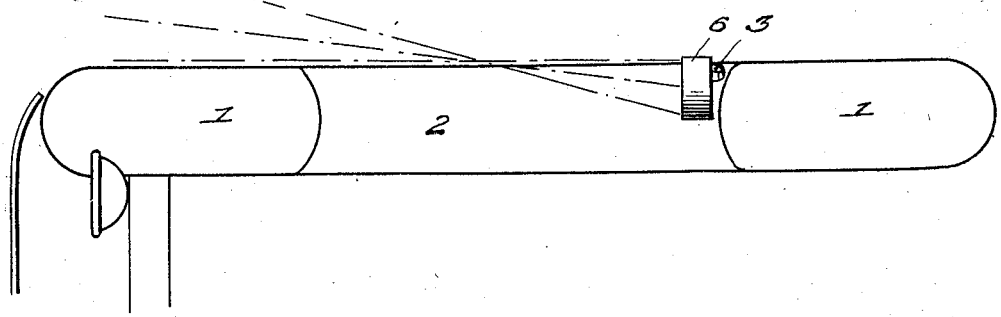
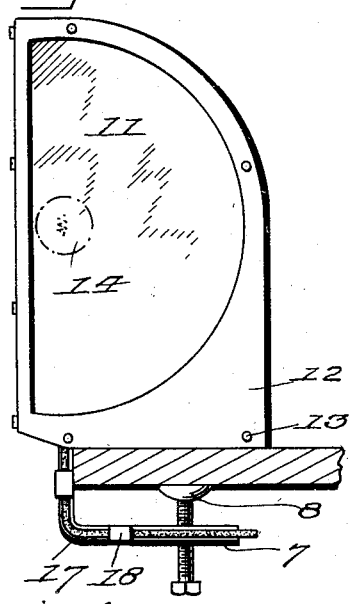
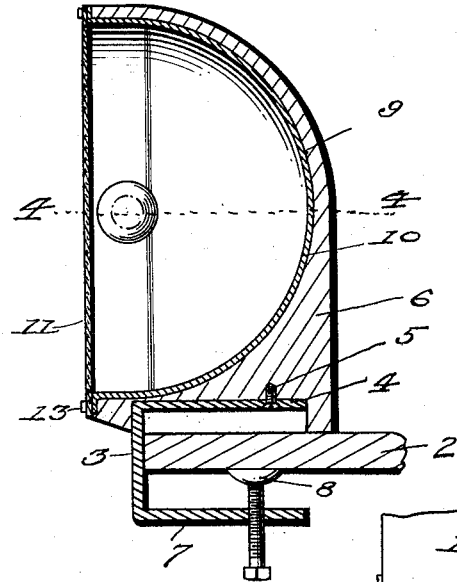
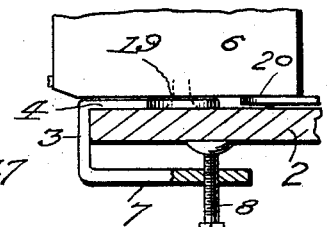
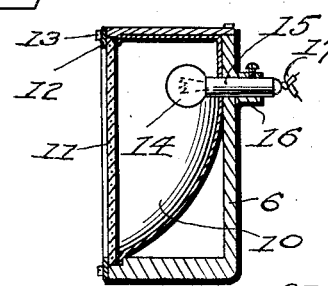
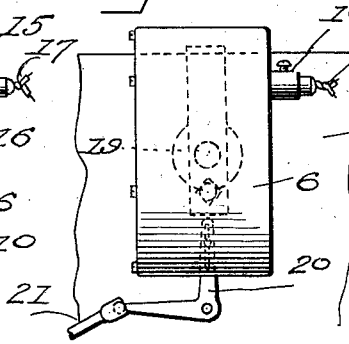
Inventor
EARL B. HEALEY Patented Nov. 10, 1931

1,830,899

UNITED STATES PATENT OFFICE

EARL B. HEALEY, OF TAMPA, FLORIDA

AUTOMOBILE RUNNING BOARD LIGHT

Application filed May 21, 1930. Serial No. 454,408.

My invention relates to improvements in automobile running board lights, and one object of my invention is the provision of a structure of the character and for the purpose stated which can be easily applied to the running board of the automobile and readily removed when desired and which will be small in size and not occupy much space on the running board and which will be of ornamental and attractive appearance to prove an embellishment to the machine.

Another object of my invention is the provision of a portable running board light which will throw a large clear beam of light forward and to the side to enable the driver under all conditions of the weather to see the side of the road and prevent the motor from leaving the road, and thereby preventing the horrible accidents which are constantly occurring with resultant property damage and loss of life.

Another object of my invention is the production of a portable light of the character described which can be easily applied and removed without damage to the running board and which can be adjusted to throw the light in the direction desired and to suit circumstances and conditions.

Another object of my invention is the provision of a running board light which will be entirely out of the way of access to and from the automobile and which can serve as a stationary light and which if found necessary and desirable can be disconnected from the running board and used for any kind of illuminating uses and thus form a handy article with manifold uses.

A further object of my invention is the provision of a portable running board light which will be the embodiment of simplicity and durability and capable of production at a very small price and which with its many other advantages, will make the light thoroughly efficient and practical from every point of view.

With these objects in view my invention consists of a portable running board light embodying novel features of construction and combination of parts, substantially as described and claimed and as shown in the accompanying drawings, in which:

Figure 1 represents a top plan view of the running board of an automobile with my light applied and showing the rays of light projected to the front and side.

Figure 2 represents a front elevation of the light secured upon the running board and shown on an enlarged scale.

Figure 3 represents a vertical central sectional view of the light.

Figure 4 represents a sectional view taken on line 4—4 of Figure 3.

Figure 5 represents a top plan view of a modified form of my light having means for adjusting said light, and Figure 6 represents a detail view of the structure shown in Figure 5.

Referring by numeral to the drawings in which the same numbers of reference denote like parts in all the views of said drawings:

The numeral 1 designates the fenders and 2 the running board of an automobile to which my light is applied, and which light is of simple construction and comprises the yoke shaped bracket 3, having its upper arm 4, secured by fastenings 5, to the casing 6, of the light and its lower arm 7, having mounted therein the clamping element 8, which secures the light to the running board and which while providing a rigid and reliable securing means, can be easily released when found necessary.

From this construction it will be seen that the casing carries means for clamping the light upon the running board and allows its removal when necessary and the casing is of substantially semi-circular outline and cupped or concaved at 9, to receive the reflector 10, which is covered by the glass panel 11, and which is secured in place by the plate 12 and fastenings 13, and properly placed in the casing and reflector is the lamp 14, having its collar 15, retained in the sleeve 16, formed on the casing and from the lamp leads the light supplying wires 17, which after leaving the casing follow the course of the clamping member and are retained by clips 18, as shown in Figure 2.

It will thus be seen that the light is applied to the running board on the right side and adjacent the rear fender and throws the light forward and to the side plainly illuminating the road on the right of the machine and making it practically impossible for the driver to guide the motor off the road in any kind of weather, which is a most important advantage. In the form of my invention shown in Figures 5 and 6, the casing is pivotally mounted at 19, to allow it to be turned by means of the pivoted bell crank lever 20, through the medium of the arm 21, to throw the light beam in any direction desired with reference to the machine and road, as circumstances require.

The many advantages of my running board light will be readily understood and appreciated by all motorists, and it is evident that I provide a portable light which can be instantly applied to the running board, or removed when found necessary; which light is small and compact in size and of ornamental appearance; which can be used in a stationary position or adjusted to suit the desires of the driver; which can be used as a running board light or for any other purpose where an illumination medium is required.

The invention may be used alone and the front lights be extinguished, as the light from the running board light will be thrown forward and to the right side and provide the necessary illumination to enable the driver to see the road under all weather conditions, which is a further advantage of my improvement.

It will be noted that the lamp body is of substantially rectangular form with the front shaped to receive the concaved reflector, the lower portion heavy or weighted, as shown in Figure 3, and with flat lower face to rest on the upper face of the running board and with the clamp at a right angle to the base of the body and the running board to secure the body firmly and rigidly upon the running board and to allow its removal when desired to use the lamp for work upon or around the vehicle.

I claim:

A running board light of the character and for the purpose described, comprising a casing of substantially rectangular form having a heavy or weighted lower portion and a flat face to rest on the running board, a reflector fitted in the front of said casing, said casing having a socket in its lower portion, a yoke-shaped clamping member having one arm fixedly mounted in the socket of the lower portion of said casing and having an angular portion to fit upon the running board and means mounted in said angular portion and engaging the underface of the running board to secure the light in position.

In testimony whereof I affix my signature.

EARL B. HEALEY.